(12) United States Patent
Davis (10) Patent No.: US 11,003,695 B2
(45) Date of Patent: May 11, 2021

(54) METHOD, APPARATUS AND ARTICLE OF MANUFACTURE FOR CATEGORIZING COMPUTERIZED MESSAGES INTO CATEGORIES

(71) Applicant: RSA Security LLC, Bedford, MA (US)

(72) Inventor: Sashka T. Davis, Vienna, VA (US)

(73) Assignee: RSA Security LLC, Bedford, MA (US)

( * ) Notice: Subject to any disclaimer, the term of this patent is extended or adjusted under 35 U.S.C. 154(b) by 0 days.

(21) Appl. No.: 16/817,934

(22) Filed: Mar. 13, 2020

(65) Prior Publication Data

US 2020/0220768 A1 Jul. 9, 2020

Related U.S. Application Data

(63) Continuation of application No. 15/684,235, filed on Aug. 23, 2017, now Pat. No. 10,594,546.

(51) Int. Cl.

| | |
|---|---|
| *G06F 16/28* | (2019.01) |
| *H04L 12/24* | (2006.01) |
| *G06F 11/34* | (2006.01) |
| *G06F 40/30* | (2020.01) |
| *G06F 40/284* | (2020.01) |
| *G06F 17/40* | (2006.01) |
| *H04L 29/08* | (2006.01) |
| *H04L 12/58* | (2006.01) |

(52) U.S. Cl.
CPC ........ *G06F 16/285* (2019.01); *G06F 11/3476* (2013.01); *G06F 17/40* (2013.01); *G06F 40/284* (2020.01); *G06F 40/30* (2020.01); *H04L 41/069* (2013.01); *H04L 51/12* (2013.01); *H04L 67/10* (2013.01); *H04L 67/12* (2013.01); *H04L 67/2809* (2013.01)

(58) Field of Classification Search
CPC ...... G06F 16/285; G06F 17/40; G06F 21/554; H04L 43/16; H04L 67/12; H04L 67/2809; H04L 51/12; G06N 20/00; G06Q 10/107
See application file for complete search history.

(56) References Cited

U.S. PATENT DOCUMENTS

| | | | |
|---|---|---|---|
| 9,064,210 B1 * | 6/2015 | Hart | G06N 20/00 |
| 2010/0058178 A1 * | 3/2010 | Dong | H04L 51/12 |
| | | | 715/256 |
| 2016/0269857 A1 * | 9/2016 | Naqvi | H04L 67/2809 |
| 2019/0034517 A1 * | 1/2019 | Byrd | G06F 17/40 |

FOREIGN PATENT DOCUMENTS

WO WO-2017131791 A1 * 8/2017 .......... G06F 11/3476

* cited by examiner

*Primary Examiner* — Kyung H Shin
(74) *Attorney, Agent, or Firm* — Danielson Legal LLC (57) ABSTRACT

There is disclosed herein techniques for categorizing computerized messages into categories. In one embodiment, there is disclosed a method. The method comprising performing an analysis of one or more computerized messages that includes identifying a set of discriminatory tokens in the one or more computerized messages that are representative of a category and determining for each discriminatory token a respective weight by which the token describes the category. The method also comprises determining a similarity between a computerized message and the category based on the content of the computerized message, the set of discriminatory tokens and the respective weights. The method further comprises classifying the computerized message as belonging to the category upon determining that the computerized message and the category are similar.

20 Claims, 3 Drawing Sheets

METHOD, APPARATUS AND ARTICLE OF MANUFACTURE FOR CATEGORIZING COMPUTERIZED MESSAGES INTO CATEGORIES

RELATED APPLICATIONS

This application is a continuation of U.S. application Ser. No. 15/684,235 filed on Aug. 23, 2017. The entire teachings of the above application are incorporated herein by reference.

TECHNICAL FIELD

The present invention relates generally to computerized messages. More particularly, the present invention relates to a method, an apparatus and an article of manufacture for categorizing computerized messages into categories.

BACKGROUND OF THE INVENTION

Computer systems and devices make extensive use of logs to collect information regarding computer system operation. Log information can be used for a variety of purposes including accounting, troubleshooting, and various types of monitoring including security-related monitoring. For example, security information and event management (SIEM) systems are known that receive logs generated by devices such as servers, network devices, etc., and use the information in the logs to assess system operation from a security perspective.

As will be appreciated, due to the potential of having to handle a large number of log messages, many systems are configured to automatically categorize these respective log messages into categories such that the events that generated these messages can be drawn to the attention of an appropriate administrator in a timely fashion. One traditional approach to processing and categorizing log messages includes utilizing customized parsers that are aware of the format and the structure of log messages generated by each device or process run by the device. There are, however, multiple problems with such an approach. First, it requires exact knowledge of the specification of each log message from each vendor. If the specification of the log message changes, the parser that processes those messages will also have to change. This approach is expensive and not scalable as the number of parsers (or the complexity of a single parser that accomplishes the job) grows linearly with the number of devices that produce the log messages. In addition, some vendors might not export log message specifications resulting in a customized parser being made based on observed messages with no guarantee as to whether log messages will be processed and categorized correctly.

An alternative way of processing and categorizing log messages into categories is to derive a set of rules and regular expressions that match log messages to categories based on what specific rules are triggered or expressions satisfied. The problem with this approach is that the system itself will become exceedingly complex when it has to satisfy a large but realistic set of categories. Such a complex system will be difficult to maintain, extend, and adapt to new categories and to log messages that do not conform to the existing patterns and rules.

There is, therefore, a need to address at least some of the above identified problems.

SUMMARY OF THE INVENTION

There is disclosed a method comprising steps of: performing an analysis of one or more computerized messages, wherein performing the analysis comprises identifying a set of discriminatory tokens in the one or more computerized messages that are representative of a category and determining for each discriminatory token a respective weight by which the token describes the category; determining a similarity between a computerized message and the category based on the content of the computerized message, the set of discriminatory tokens and the respective weights; and classifying the computerized message as belonging to the category upon determining that the computerized message and the category are similar; and wherein the steps are performed by at least one processing device comprising a processor coupled to a memory.

There is also disclosed an apparatus comprising: at least one processing device comprising a processor coupled to a memory; said at least one processing device being configured to: perform an analysis of one or more computerized messages, wherein performing the analysis comprises identifying a set of discriminatory tokens in the one or more computerized messages that are representative of a category and determining for each discriminatory token a respective weight by which the token describes the category; determine a similarity between a computerized message and the category based on the content of the computerized message, the set of discriminatory tokens and the respective weights; and classify the computerized message as belonging to the category upon determining that the computerized message and the category are similar.

There is also disclosed an article of manufacture comprising a processor-readable storage medium having stored therein program code of one or more software programs, wherein the program code when executed by at least one processing device causes said at least one processing device to: perform an analysis of one or more computerized messages, wherein performing the analysis comprises identifying a set of discriminatory tokens in the one or more computerized messages that are representative of a category and determining for each discriminatory token a respective weight by which the token describes the category; determine a similarity between a computerized message and the category based on the content of the computerized message, the set of discriminatory tokens and the respective weights; and classify the computerized message as belonging to the category upon determining that the computerized message and the category are similar.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
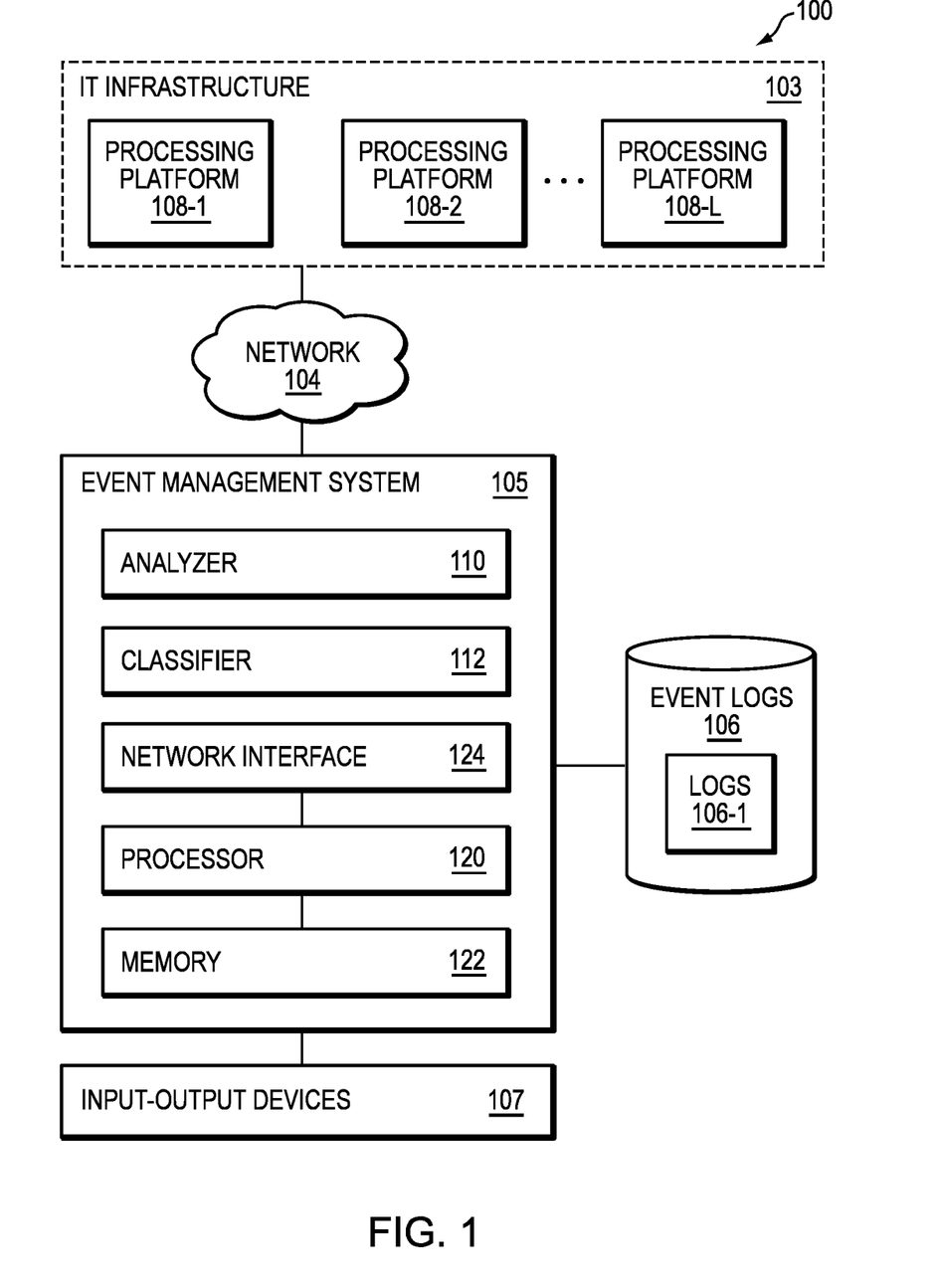
FIG. 1 shows an information processing system that incorporates IT infrastructure and an event management system in an illustrative embodiment of the invention.

FIG. 1 shows an information processing system 100 configured in accordance with an illustrative embodiment of the invention. The system 100 in this embodiment comprises an event management system 105 coupled to an information technology (IT) infrastructure 103 via a network 104. The event management system 105 generally provides monitoring and control functions for the IT infrastructure 103.

The IT infrastructure 103 comprises a plurality of processing platforms 108-1, 108-2, . . . 108-L, each of which may comprise a different set of one or more computers, servers, storage devices or other processing devices, in any combination. Examples of processing platforms that may form portions of the IT infrastructure 103 in system 100 will be described in more detail below in conjunction with FIGS. 3 and 4. Such processing platforms may comprise cloud infrastructure of a cloud service provider.

The network 104 comprises a global computer network such as the Internet, although other types of networks can be part of the system 100, including a wide area network (WAN), a local area network (LAN), a satellite network, a telephone or cable network, a cellular network, a wireless network such as a WiFi or WiMAX network, or various portions or combinations of these and other types of networks. The system 100 in some embodiments therefore comprises combinations of multiple different types of networks each comprising network devices configured to communicate using IP or other related communication protocols.

The event management system 105 has an associated database 106 configured to store event logs. The event logs database 106, more particularly, stores logs 106-1 relating to events associated with resources in the IT infrastructure 103. The database 106 in the present embodiment is implemented using one or more storage devices associated with the event management system 105. Such storage devices may comprise, for example, storage products such as VNX® and Symmetrix VMAX®, both commercially available from Dell EMC of Hopkinton, Mass. A variety of other storage products may be utilized to implement at least a portion of the storage devices associated with the event management system 105.

Also associated with the event management system 105 are input-output devices 107, which illustratively comprise keyboards, displays or other types of input-output devices in any combination. Such input-output devices are used to support one or more user interfaces to the event management system 105, as well as to support communication between the event management system 105 and other related systems and devices not explicitly shown.

The event management system 105 further comprises an analyzer 110. The analyzer 110 is configured analyze one or more computerized messages which in this particular embodiment are log messages 106-1. The analyzer 110 is configured to perform the analysis by identifying a set of discriminatory tokens in the messages that are representative of a category and determining for each discriminatory token a respective weight by which the token describes the category.

The event management system 105 also comprises a classifier 110 for classifying computerized messages including log messages 106-1 in this particular embodiment. The classifier is utilized to determine a similarity between log messages 106-1 and the category based on the content of the log messages 106-1, the set of discriminatory tokens and the respective weights. The classifier 110 is further utilized to classify log messages 106-1 messages as belonging to the category based on the similarity.

It is to be appreciated that the particular arrangement of modules illustrated in the FIG. 1 embodiment is presented by way of example only, and alternative arrangements can be used in other embodiments. For example, the functionality associated with the modules 110 and 112 in other embodiments can be combined into a single module, or separated across a larger number of modules.

The event management system 105 in the FIG. 1 embodiment is assumed to be implemented using at least one processing device. Each such processing device generally comprises at least one processor and an associated memory, and implements one or more functional modules for controlling certain features of the event management system 105.

More particularly, the event management system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the event management system 105 to communicate over the network 104 with the IT infrastructure 103, and illustratively comprises one or more conventional transceivers.

At least portions of the analyzer 110 and the classifier 112 may be implemented at least in part in the form of software that is stored in memory 122 and executed by processor 120.

During operation, the event management system 105 is configured to categorize messages 106-1 by utilizing the analyzer 110 to perform an analysis of the messages 106-1. For example, a log message may comprise linguistic content describing an event caused by a router experiencing an excessive number of collisions, such as: 'Half-duplex loopback detected, collision threshold exceeded on FastEthernet0/31'. In response to such a message, the analyzer 110 may adopt the following approach to the analysis of this and other log messages.

1. Tokenization

Messages are split into words. Special symbols are extracted and removed. The special symbols are single characters that are used to split a stream of characters onto a stream of words (or tokens). Those characters do not belong to a token and must be removed. For example, special symbols include: spaces, question marks, percent signs, brackets, parenthesis, ampersand, and so on. This list is not exhaustive.

2. Normalization a. Special Entities Recognition

Special entities such as IP addresses, MAC addresses, Date, Time, URLs, E-mail addresses, and Numbers are recognized and replaced with the corresponding special entity's name. This list is not exhaustive and the list of special entities is highly dependent on the application. This list is representative for formatting network log messages.

Special entities recognition is extremely important for the ability of the model to generalize. For example, if an instance of an IP address entity was not recognized and replaced by the entity name, then the model will learn the particular instances, e.g., 123.45.6.789, and will overfit the training data, causing an inability to generalize and unsatisfactory performance during the deployment phase.

b. Common Entity Removal

Date, Time, and Numbers entities are removed from the messages as they are common and do not have the power to discriminate between different categories. In other applications, the list of common entities may be different.

c. Common Word Removal (Also Known as English Stop Word Removal in Computational Linguistics)

Modified English Stop list is used to remove words that belong to log messages but also appear in the Modified English Stop list. For example, the words 'and', 'or', 'make', 'do', and the like will be considered as such words. Again, this list is not exhaustive, nor limited to the English language. Similar techniques are applicable in all languages.

d. Case Normalization

All remaining words that belong to the messages except those that are termed to be Special Entities are converted to lower case. However, it should be noted that in other embodiments the approach may simply attempt to separate the tokens into separate spaces within the alphabet so they cannot overlap. For example, the generalized tokens could be represented as symbols that don't occur in the other tokens, and the mixed case could be deemed fine for the remaining tokens.

3. Topic Model Centroids Identification

To identify tokens that are representative of each event category, the following topic modeling algorithms are utilized. To do so, for each category whose messages have been tokenized and normalized the following is performed:

a. Device-to-document conversion

Here, each log message is treated as a sentence and group all messages that are generated by a single device and belong to a single topic as a single text document.

b. Document-by-term matrix formulation

Group together all documents that belong to a single topic across all devices. Compute document-by-term matrix using bag-of-words, normalized term frequency, and counts representations.

c. Topic modeling i. Use Latent Dirichlet Allocation with counts document-by-term matrix representation to compute one topic vector.

ii. Use Non-Negative Matrix Factorization with bag-of-words to compute a rank-1 factorization.

iii. Non-Negative Matrix Factorization and normalized term-frequency representation to compute a rank-1 factorization.

Each algorithm produces a single topic vector whose components are the words and the weight with which each word describes the topic. From the three possible models the one that has highest precision in classifying messages is chosen. In this particular case with a system and network appliances that is LDA.

d. Normalization

The topic vectors are normalized to have unit length, $|L2|=1$; (alternatively L1 norm can be computed).

e. Dimensionality reduction of topic-model centroids

Remove low-weight tokens from topic centroids whose weight falls below some threshold. Conversely take only the highest weight tokens whose combined weight does not exceed some fraction of the total weight. Normalize again so that the length of the topic vector is 1.

Note that the low-weight tokens are removed because they represent the noise in the data. If they are left then the model will learn the noise, overfit the training data, and thus lead to a model that has low abilities to generalize and poor performance during deployment.

At the end, for every category a topic-model centroid is generated, let that be $C_i=\{(t_{i1}, w_{i1}) \ldots (t_{ik}, w_{ik})\}$, represented by a set of tokens and their weights. Here, $t_i$ is a token (keyword) and $w_i$ is the weight with which $t_i$ describes the category. The weights are numeric and are reduced so as to have Euclidean length equal to 1.

Upon receipt of a new message M that has to be assigned to a category, the classifier 112 of the event management system 105 adopts the following approach and performs the following steps:

1. Tokenize and normalize the message M, $M=\{(m_1, n_1) \ldots, (m_k, n_k)\}$, where $m_i$, $n_i$ is a token and the number of times the token appears in M It should be noted that the tokenization and normalization of the message M follows the same process as the tokenization and normalization steps described above.

2. Compute the set intersection between the tokens of M and each topic-model centroid $C_i$.

3. Assign M to the category whose set intersection is the largest

4. If two or more categories achieve the maximum intersection size, let those be $C_i=\{(t_{i1}, w_{i1}) \ldots (t_{jk}, w_{jk})\}$, and $C_j=\{(t_{j1}, w_{j1}) \ldots (t_{jk}, w_{jk})\}$, then i. project M onto the $C_j$'s token space, let that be $M'=\{(t_{j1}, n_{j1}) \ldots (t_{jk}, n_{jk})\}$, where $n_{jp}=n_i$, if $t_{jp}$ belongs to the tokens of M and 0 otherwise.

ii. compute the dot product $<(W_{i1}, \ldots, W_{ik})\}, (n_{i1}, \ldots, n_{ik})>$ and assign M to the category whose dot product is the largest.

It is important to note that computing the topic-model centroids using the steps 1 to 3 described above with respect to the analyzer 110 may be a one-time work that is performed prior to deployment. Once the model is computed all incoming messages are categorized using steps 1 to 4 described with respect to the classifier 112. These steps 1 to 4 can be implemented extremely efficiently by representing each topic-model centroid as a hash table keyed by the keyword tokens and the values are the corresponding weights. Suppose, there is a set of N categories, represented by N individual hash tables. Steps 2, 3, and 4 above become a simple hash table look up and will run in time N(O(n)), where n is the number of tokens in the log message M. Also, it should be noted that steps 2 and 3 can be parallelized trivially, and if N processors are available, then the running time is O(n).

Advantageously, the approach described herein for classifying log messages into categories compares favorably to the conventional parser-based log message classification approach. Suppose a large enterprise comprises of 10,000 distinct software appliances and 260 different categories. The approach described herein will compute 260 topic-model centroids and a hash table for each, while the parser-based approach will have to encode the distinct structure of the messages of each of the 10,000 devices. It should be noted that steps 1 to 4 above do not use the identity of the device that generates the message, therefore if a new software device is added to the enterprise the approach herein will be able to process and categorize the messages generated by it, while the parser-based approach will have to develop and deploy a parser for the new device. If a new category must be added to the model the approach herein will only have to compute the topic-model centroid for it, given log messages that belong to that category, and update steps 1 to 4 above with the corresponding hash table.

It should be noted that the approach described above can also be applied to specialized network such as a network of medical devices, or specific supervisory control and data acquisition ('SCADA') networks, where the corpus of messages exhibit different linguistic content. For example, possible extensions of the proposed approach:

Special Entity Recognition extension: Special Entity Recognition is not bound to identify entities related to computer systems and network communication such as IP and MAC addresses, URLs, etc. The main point is to identify instances of Special Entities that are domain specific but important to a given log message corpus and to replace each such instance with the corresponding Special Entity's name. For example, in processing log messages generated by medical devices special entities might be DISEASE, BLOOD_TESTS, GENETIC_MARKERS, etc.

Common Entity removal: This is also domain specific and statistical tests can be used to identify Special Entities whose discriminative power is low.

Common word removal: A standard English Stopword List is utilized but again domain specific list of stopwords can be used to remove other words from the messages whose discriminative power is low. Stopword lists also can be used in other languages, English is provided only as an example.

Stemming: In this case stemming was not beneficial, however for certain corpuses stemming or lemmatization might be beneficial prior to computing topic models.

Topic Modeling
  a. extend the matrix' cell representation: To compute a topic model a document-by-term matrix is built. In some experiment three different cell representations for the matrix were utilized: 0/1 entries, normalized TF, and term Counts as they were most suitable for the data observed. There are other useful cell representations such as log-entropy weights, TF-IDF, etc., that might be a better fit for a different message corpus.
  b. Topic-model centroid: currently 3 distinct models are computed and used as a topic-model centroid and the one computed by the Latent Dirichlet Allocation (LDA) algorithm is considered the best. For a different corpus however, a Non-Negative Matrix Factorization (NMF) model might outperform the LDA model, or a simple or a weighted average of all models could deliver a better topic-model centroid. In the approach herein, a single topic vector is computed but it might be advantageous in the future to compute two or more topic vectors and to combine them to produce a better topic-model centroid. If more than one topic vector is computed then in addition to the LDA and NMF, the Latent Semantic Indexing (truncated SVD) algorithm may be utilized to compute multiple topic vectors prior to generating the final topic-model centroid.

While the particular set of elements in the event management system 105 shown in FIG. 1 for categorizing log messages into categories is presented by way of illustrative example only, it should be understood that in other embodiments additional or alternative elements may be used. Thus, another embodiment may include additional or alternative systems, devices and other network entities, as well as different arrangements of modules and other components. By way of example, in other embodiments, the event management system 105 can be eliminated and one or both of the analyzer 110 and the classifier 112 can be implemented elsewhere in the system 100.

In some embodiments, the event management system 105 is a part of or otherwise associated with another system, such as, for example, a security operations center (SOC) or a critical incident response center (CIRC).

Figure 2:
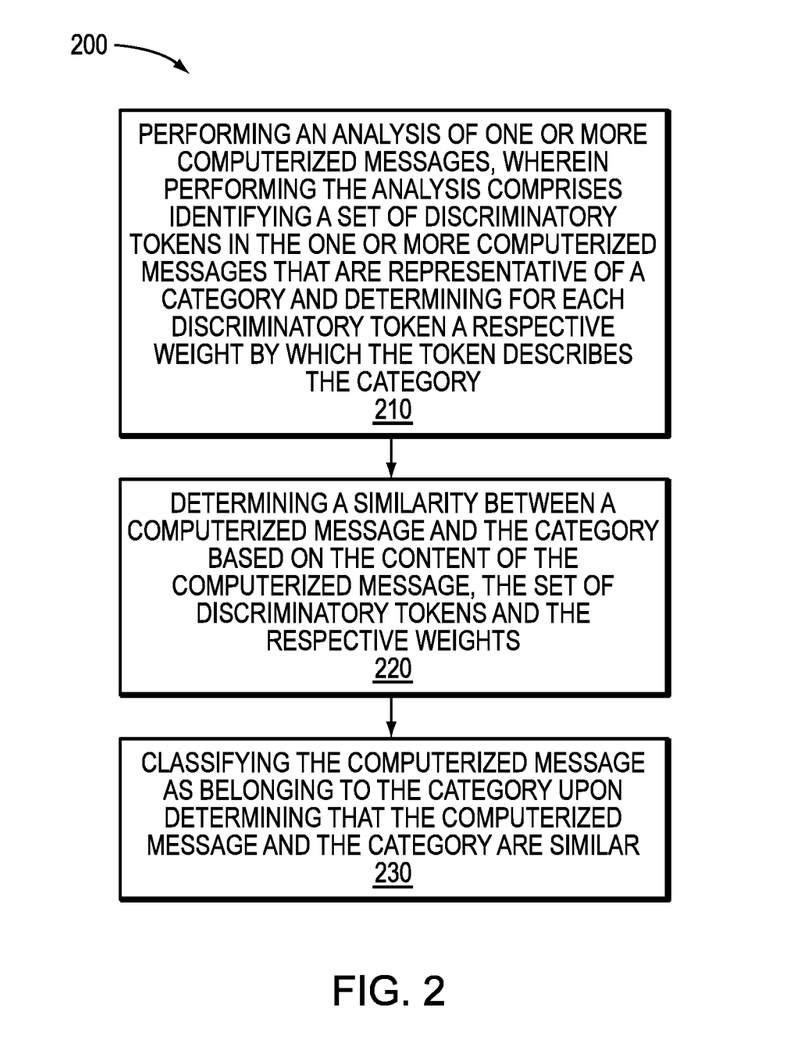
FIG. 2 is a flow diagram of a process for categorizing computerized messages into categories in the information processing system of FIG. 1.

Referring to FIG. 2, there is illustrated a flowchart 200 of processing steps that may be performed in an embodiment in accordance with techniques herein. In the flowchart 200, the steps are summarized in individual blocks. The steps may be performed in hardware, or as processor-executable instructions that may be executed by a processor. Furthermore, the steps may, but need not necessarily, be implemented in the system 100 of FIG. 1.

At step 210, an analysis of one or more computerized messages is performed. The analysis comprising identifying a set of discriminatory tokens in the one or more computerized messages that are representative of a category and determining for each discriminatory token a respective weight by which the token describes the category. It should be understood that computerized messages in the context of this disclosure refer to messages in a form suitable to be stored and/or processed by a computer regardless of whether such messages are generated by a computer or not. Furthermore, the computerized messages may be semi-structured messages including restrictive linguistic content. For example, the computerized messages may comprise log messages. The computerized messages may also derive from events relating to resources in an Information Technology (IT) infrastructure.

In at least one embodiment, the analysis as performed comprises multiple steps. For example, as discussed above with respect to the previous figure, the content of the one or more computerized messages may be separated into a plurality of respective tokens in order to facilitate the identification of the set of discriminatory tokens and the determination of the respective weights. Non-discriminatory tokens may then be removed from the plurality of respective tokens such that tokens deemed to be common cannot be considered as being representative of the category. Furthermore, any instance of a discriminatory token in the plurality of tokens is detected and replaced with a generalized version of the discriminatory token. The tokens may also be converted to one of lower or upper case with the exception of those that have been generalized and exist in the other of the one of the lower or upper case.

Additionally, in at least one embodiment, each computerized message may be treated as a sentence such that all messages that are generated by a single device and belong to a single topic are grouped as a single text document. Subsequently, all documents that belong to a single topic across one or more devices may then be grouped and a document-by-term matrix computed using bag-of-words, normalized term frequency, and counts representations. A topic model technique may then be utilized to facilitate production of a single topic vector whose components include a set of discriminatory tokens identified as being representative of the category and respective weights determined for each discriminatory token. In one embodiment, utilizing the topic model technique may produce multiple topic vectors from which the single topic vector is produced. For example, utilizing the topic model technique may include one or more of applying a latent dirichlet allocation with counts document-by-term matrix representation to compute one topic vector, applying a non-negative matrix factorization with bag-of-words to compute a rank-1 factorization, applying non-negative matrix factorization and normalized term-frequency representation to compute a rank-1 factorization, and applying a latent semantic indexing technique. Furthermore, one or more of the highest weighted tokens whose combined weight do not exceed a fraction of the total weight may also be selected and normalized such that the length of the topic vector corresponds to a defined value. The topic vector may also be represented as a hash table keyed by the discriminatory tokens and in which values are represented by the weights.

At step 220, a similarity between a computerized message and the category is determined based on the content of the computerized message, the set of discriminatory tokens and the respective weights. It should be understood that in at least one embodiment determining the similarity may comprise determining for the computerized message a set of tokens and a number of times the respective tokens appear in the computerized message. The set intersection between the tokens of the computerized message and the category may then be determined. The computerized message and the category may then be determined to be similar if the set intersection is largest. If the set intersection between the tokens of the computerized message and the category and a set intersection between tokens of another computerized message and the category achieve a maximum intersection size, then determining the similarity may comprise projecting the computerized message onto token space of the category and computing a dot product for facilitating the classification of the computerized message to the category based on the dot product being the largest.

At step 230, the computerized message is classified as belonging to the category upon determining that the computerized message and the category are similar.

Figure 3:
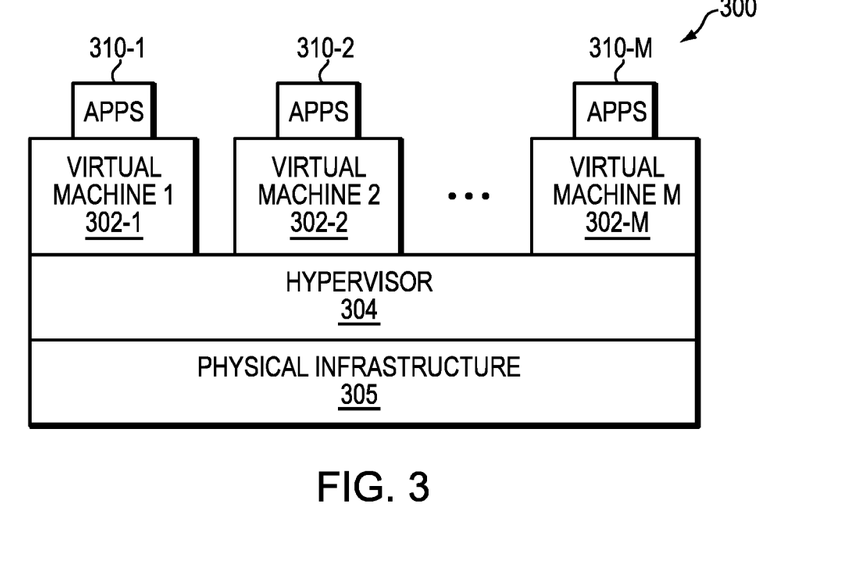
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the IT infrastructure 103.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the IT infrastructure 103 of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from Dell EMC of Hopkinton, Mass. A variety of other storage products may be utilized to implement at least a portion of the IT infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

Figure 4:
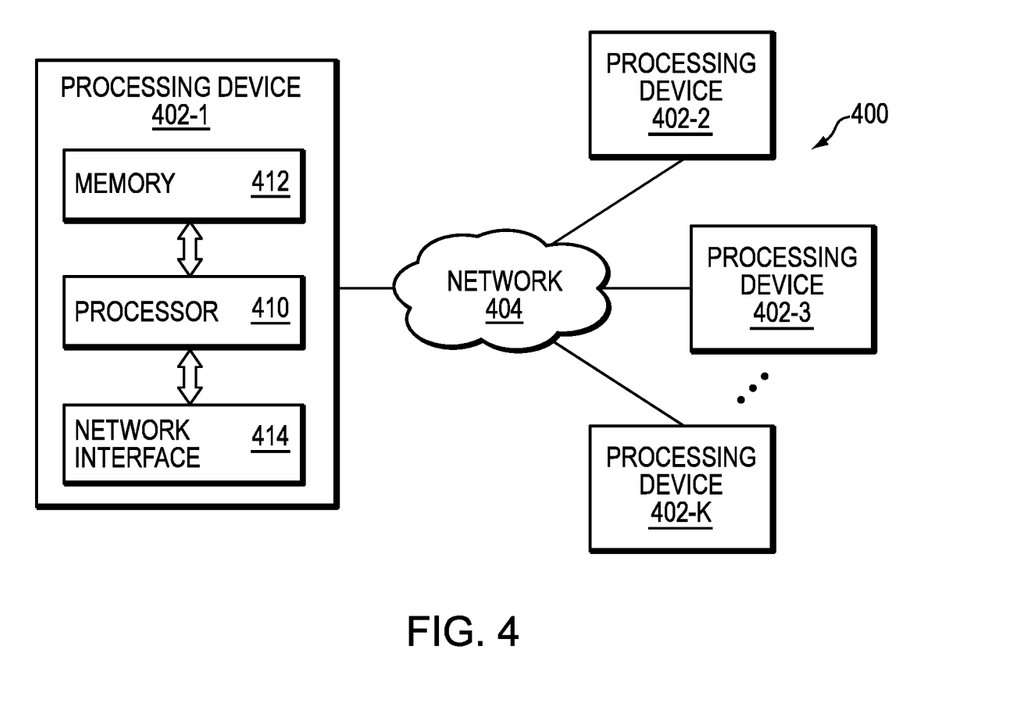

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Multiple elements of information processing system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, IT infrastructure and processing device configurations. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising steps of:
  performing an analysis of one or more computerized messages, wherein performing the analysis comprises identifying a set of discriminatory tokens in the one or more computerized messages that are representative of a category and determining for each discriminatory token a respective weight by which the token describes the category;
  determining a similarity between a computerized message and the category based on the content of the computerized message, the set of discriminatory tokens and the respective weights; and
  classifying the computerized message as belonging to the category upon determining that the computerized message and the category are similar, wherein classifying the message comprises:
    tokenizing and normalizing the message M, $M=\{(m_1, n_1) \ldots, (m_k, n_k)\}$, where $m_i$, $n_i$ is a token and the number of times the token appears in M;
    computing a set intersection between the tokens of M and each topic-model centroid $C_i$; and
    assigning M to the category whose set intersection is largest,
    wherein the steps are performed by at least one processing device comprising a processor coupled to a memory.

2. The method as claimed in claim 1, wherein the one or more computerized messages comprise log messages.

3. The method as claimed in claim 1, wherein the one or more computerized messages derive from events relating to resources in an Information Technology (IT) infrastructure.

4. The method as claimed in claim 1, wherein assigning M to the category whose set intersection is the largest comprises assigning M to the category C that maximizes the dot product between M and C.

5. The method as claimed in claim 1, wherein performing the analysis further comprises separating content of the one or more computerized messages into a plurality of respective tokens such that the set of discriminatory tokens can be identified.

6. The method as claimed in claim 1, wherein performing the analysis further comprises removing non-discriminatory tokens from the one or more computerized messages such that tokens deemed to be common cannot be considered as being representative of the category.

7. The method as claimed in claim 1, wherein performing the analysis further comprises detecting an instance of a discriminatory token in the one or more computerized messages and replacing the instance of the discriminatory token with a generalized version of the discriminatory token.

8. The method as claimed in claim 7, wherein performing the analysis further comprises converting the tokens in the one or more computerized messages to one of lower or upper case except those discriminatory tokens that have been generalized and exist in the other one of the lower and upper case.

9. The method as claimed in claim 1, wherein performing the analysis further comprises treating each computerized message as a sentence, grouping all messages that are generated by a single device and belong to a single topic as a single text document, grouping together all documents that belong to a single topic across one or more devices, and computing document-by-term matrix using bag-of-words, normalized term frequency and counts representations.

10. The method as claimed in claim 1, wherein performing the analysis further comprises utilizing a topic model technique to facilitate production of a single topic vector whose components include a set of discriminatory tokens identified as being representative of the category and respective weights determined for each discriminatory token.

11. The method as claimed in claim 10, wherein utilizing the topic model technique produces multiple topic vectors from which the single topic vector is produced.

12. The method as claimed in claim 10, wherein utilizing the topic model technique includes at least one of applying a latent Dirichlet allocation with counts document-by-term matrix representation to compute one topic vector, applying a non-negative matrix factorization with bag-of-words to compute a rank-I factorization, applying non-negative matrix factorization and normalized term-frequency representation to compute a rank-I factorization, and applying a latent semantic indexing technique.

13. The method as claimed in claim 10, wherein performing the analysis further comprises selecting one or more of the highest weighted tokens whose combined weight does not exceed a fraction of the total weight and normalizing such that the length of the topic vector corresponds to a defined value.

14. The method as claimed in claim 10, wherein performing the analysis further comprises representing the topic vector as a hash table keyed by the discriminatory tokens and in which values are represented by the weights.

15. The method as claimed in claim 1, wherein determining the similarity between the computerized message and the category comprises determining for the computerized message a set of tokens and a number of times the respective tokens appear in the computerized message.

16. The method as claimed in claim 15, wherein determining the similarity between the computerized message and the category comprises determining the set intersection between the tokens of the computerized message and the category.

17. The method as claimed in claim 16, wherein determining the similarity between the computerized message and the category is dependent on the set intersection being largest.

18. The method as claimed in claim 16, wherein if the set intersection between the tokens of the computerized message and the category and a set intersection between tokens of another computerized message and the category achieve a maximum intersection size, the determining of the similarity comprises projecting the computerized message onto token space of the category and computing a dot product for facilitating the classification of the computerized message to the category based on the dot product being the largest.

19. An apparatus comprising:
at least one processing device comprising a processor coupled to a memory;
said at least one processing device being configured to:
perform an analysis of one or more computerized messages, wherein performing the analysis comprises identifying a set of discriminatory tokens in the one or more computerized messages that are representative of a category and determining for each discriminatory token a respective weight by which the token describes the category;
determine a similarity between a computerized message and the category based on the content of the computerized message, the set of discriminatory tokens and the respective weights; and
classify the computerized message as belonging to the category upon determining that the computerized message and the category are similar, wherein classifying the message comprises:
tokenizing and normalizing the message M, M={($m_1$, $n_1$) . . . , ($m_k$, $n_k$)}, where $m_i$, $n_i$ is a token and the number of times the token appears in M;
computing a set intersection between the tokens of M and each topic-model centroid $C_i$; and
assigning M to the category whose set intersection is largest.

20. An article of manufacture comprising a processor-readable storage medium having stored therein program code of one or more software programs, wherein the program code when executed by at least one processing device causes said at least one processing device to:
perform an analysis of one or more computerized messages, wherein performing the analysis comprises identifying a set of discriminatory tokens in the one or more computerized messages that are representative of a category and determining for each discriminatory token a respective weight by which the token describes the category;
determine a similarity between a computerized message and the category based on the content of the computerized message, the set of discriminatory tokens and the respective weights; and
classify the computerized message as belonging to the category upon determining that the computerized message and the category are similar, wherein classifying the message comprises:
tokenizing and normalizing the message M, M={($m_1$, $n_1$) . . . , ($m_k$, $n_k$)}, where $m_i$, $n_i$ is a token and the number of times the token appears in M;
computing a set intersection between the tokens of M and each topic-model centroid $C_i$; and
assigning M to the category whose set intersection is largest.

* * * * *